(No Model.) 2 Sheets—Sheet 1.
S. H. HOLLEY.
DEVICE FOR SWAGING SAW TEETH.
No. 555,005. Patented Feb. 18, 1896.
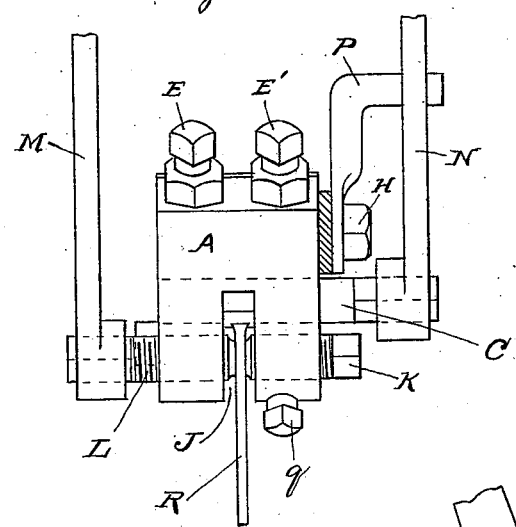
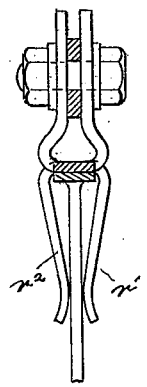
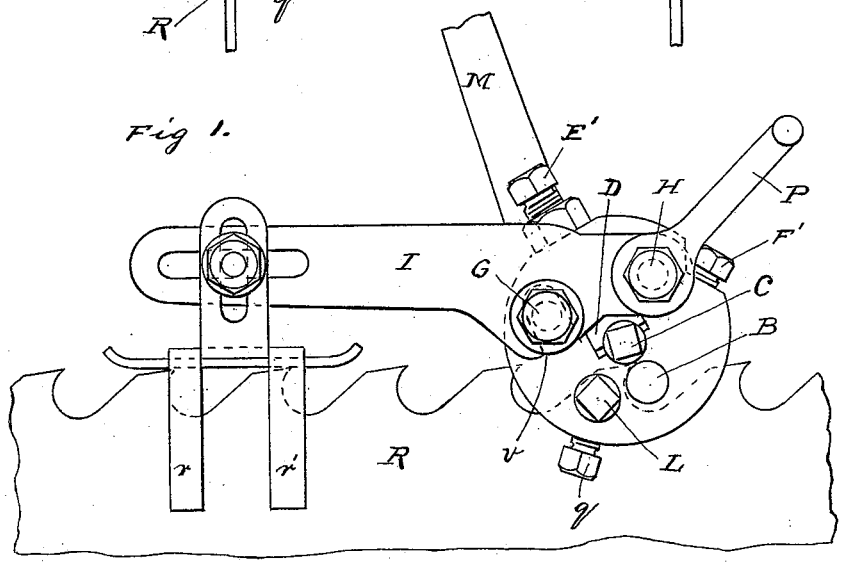
WITNESSES,  
INVENTOR.  
Seymour H. Holley  
by Clark and Pearl  
Attorneys for Inventor (No Model.) 2 Sheets—Sheet 2.
S. H. HOLLEY.
DEVICE FOR SWAGING SAW TEETH.
No. 555,005. Patented Feb. 18, 1896.
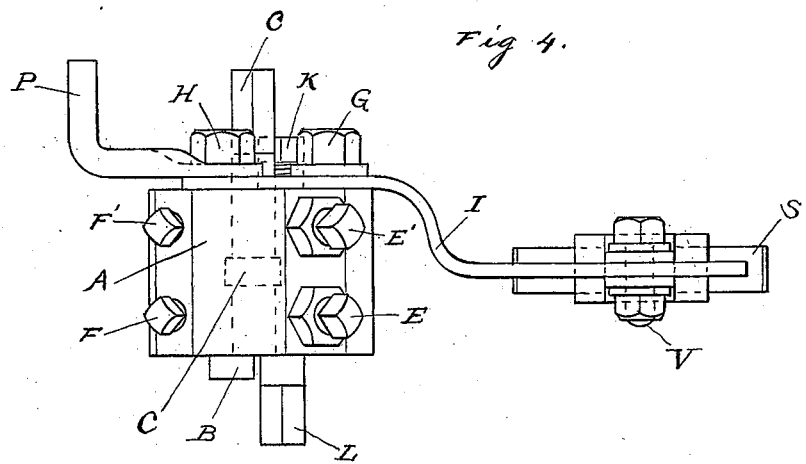
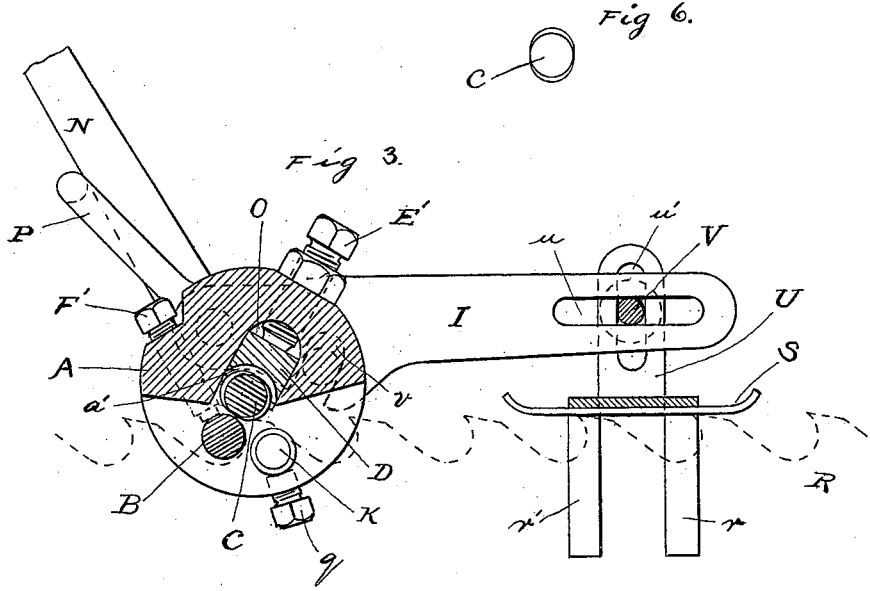
WITNESSES.
INVENTOR.

UNITED STATES PATENT OFFICE.

SEYMOUR H. HOLLEY, OF MARQUETTE, MICHIGAN, ASSIGNOR OF TWO-THIRDS TO FREDERICK O. CLARK AND SAMUEL V. RAWLINGS, OF SAME PLACE.

DEVICE FOR SWAGING SAW-TEETH.

SPECIFICATION forming part of Letters Patent No. 555,005, dated February 18, 1896.

Application filed July 3, 1895. Serial No. 554,817. (No model.)

*To all whom it may concern:*

Be it known that I, SEYMOUR H. HOLLEY, of Marquette, in the county of Marquette and State of Michigan, have invented a new and Improved Device for Swaging Saw-Teeth which are formed on the arcs of circles, constructed in accordance with the Hazard patents upon saws, numbered 486,226 and 521,343, of which the following is a specification.

My invention has for its object the production of a mechanism for spreading the points of solid saw-teeth, constructed in accordance with the Hazard patents. The present application in my judgment presents an improvement over any other device for swaging said tooth, in that it carries forward the material on the top of the tooth to make the spreading point, which would otherwise be wasted by being ground off, and produces a mechanism that is very efficient and durable and more simple and less expensive than any other device for that purpose now in use within my knowledge.

Figure 1 is a side elevation showing the general outline of my device as adjusted to the teeth of the saw, as it will appear when in operation. Fig. 2 is an end elevation as attached to the saw-tooth when in operation. Fig. 3 is a vertical section in reverse position from that shown in Fig. 1. Fig. 4 is a top plan view of my device. Fig. 5 is a front section of guide. Fig. 6 is an end elevation of oval die.

A is the body of the swage.

J is the slot through A which allows the teeth of the saw to come in position between anvil B and oval die C.

M is the handle attached to the set-screw L by which the operator moves set-screw L, and fastens my device to the saw by clamping the same between set-screws L and K.

K is a stationary set-screw held in position by small set-screw $q$.

B is an anvil cylindrical in form and is fitted in body A to a seat of the same form as die C and held in position by set-screws F and F' and fits under the point of the tooth, conforming to the circular face of the saw-tooth as made under said Hazard patents, and is also made longer than its seat, so as to furnish an additional wearing-surface, and is adjusted and held in position by set-screws F and F'.

Die C, as shown, is oval in form and its foci are equally distant from the center of the circular extended ends on a plane at right angles to a line passing through the longitudinal center, and is provided with handle N on one end for operating said die.

D is a die-block and is fitted to a body A in slot O and is in one piece extending through body A, as shown, and bears on both the extended ends of die C, with a slot $a'$ between extended ends of die C, allowing the oval of die C to revolve clear and to act as a lock to prevent die C from moving endwise.

E and E' are set-screws with jam-nuts, by which die-block D is regulated in its contact with oval die C, and by means of said set-screws E and E' die-block D is regulated in its contact with oval die C, and by means of said set-screws E and E' the operator can increase or lessen the pressure upon the back of the tooth, as desired, causing die C to bear at right angles to saw-blade, making the faces of die and anvil parallel to each other, or otherwise, as desired.

I is a guide swiveled on and secured to body A by bolt H and adjusted radially by swinging on bolt G and carries the finger U bolted to guide I by bolt V.

$r$, $r'$ and $r^2$ are guards and extensions of finger U on each side of saw-blade and are for the purpose of keeping the rest S directly on and above the saw-tooth. The slots $u$, $u'$ and $v$ give adjustment adequate for fitting the working parts to the tooth to be swaged. This arrangement is designed to maintain the body A in any desired position, while the die is at work on the tooth, to swage all the teeth on the same saw alike.

P is a stop which serves to act as a rest for die-handle when the oval die C is revolved back clear of the tooth during the time that the operator is changing swage from the tooth operated on to the next one and also serves as a washer under head of bolt H, which holds stop in position.

The swage is fastened to the saw-blade, as described, and the tooth is placed so as to stand between the die and anvil. The oval die is then revolved on the back of tooth to its point, and thus the steel is drawn toward the point of the tooth and spread. In consequence of this movement the pressure is brought to bear in such a manner as to pull and adhere the die and anvil to the tooth, and is held securely by the jaw-screws, which feature serves to require less tension on the body-screws against the saw-blade when swaging, thus prolonging the life of the screws and jaw sides and of the entire machine.

My device is for swaging the points of saw-teeth that have a round throat, that no swage known to me has been able to successfully perform. This I do by the use of a round anvil that will nearly fit this round throat. The advantage of making die C in this form is that it has a double eccentric, either of which may be adjusted for operation as the other shall be worn with use, and each eccentric face of the die which may come against the face of the tooth is so formed as to carry forward the steel upon the top or back of the tooth toward the point of the tooth, spreading the same gradually, thus preventing the splitting of the point of the tooth. It also allows anvil B to be so adjusted under the point of the tooth as to preserve the exact form of the Hazard patent tooth, and thus swaging from the back of the tooth it carries the material for making the swaged point from the back forward to the point, preserving the form of the throat of the tooth. By the adjustment of anvil B under the point in swaging, and so carrying forward the material on the back of the tooth, the tooth is preserved in original form and is not liable to be cut off, as is the case when swaging from the face or under the point of the tooth, as has developed in the actual operation and dressing of the Hazard patent tooth for use.

A further advantage is in the fact that die C may be raised or lowered in block D by means of set-screws E and E', so as to regulate the quantity of material desired to be carried forward, and thus regulate the strength or size of the swaged point, as well as to regulate the strain upon the die C and anvil B, and by means of set-screws E and E' one side of the point of the tooth may be drawn or raised so as to draw the saw when in use to either side, as desired.

What I claim is—

In a device for swaging the points of saw-teeth, the combination with body A, provided with slot J; anvil B, held in position by set-screws F and F'; die C, block D, in slot O, provided with groove $a$ and set-screws E and E', and handle N; set-screw K, with small set-screw $q$; set-screw L, with handle M; guide I having slot $u$, held to body A by bolts H and G; with finger U and rest S, held to guide I by bolt V; finger U being provided with guards and extensions $r$, $r'$ and $r^2$ and slot $u'$; and stop P; all substantially as shown and described.

Dated June 18, 1895.

SEYMOUR H. HOLLEY.

In presence of—
MARY L. RAYMOND,
N. G. DE HAAS.